(12) United States Patent
Steinberg et al.

(10) Patent No.: US 8,131,506 B2
(45) Date of Patent: *Mar. 6, 2012

(54) SYSTEM AND METHOD FOR USING A NETWORK OF THERMOSTATS AS TOOL TO VERIFY PEAK DEMAND REDUCTION

(75) Inventors: John Douglas Steinberg, Millbrae, CA (US); Scott Douglas Hublou, Redwood City, CA (US)

(73) Assignee: EcoFactor, Inc., Millbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,162

(22) Filed: Feb. 28, 2011

(65) Prior Publication Data

US 2011/0166828 A1    Jul. 7, 2011

Related U.S. Application Data

(63) Continuation of application No. 12/183,949, filed on Jul. 31, 2008, now Pat. No. 7,908,116.

(60) Provisional application No. 60/994,011, filed on Sep. 17, 2007, provisional application No. 60/963,183, filed on Aug. 3, 2007.

(51) Int. Cl.
    *G06F 15/00* (2006.01)

(52) U.S. Cl. ......................................... 702/182

(58) Field of Classification Search .................. 702/176, 702/182–184; 700/276, 278; 236/1 C, 46 A, 236/46 R; 165/238–239
See application file for complete search history.

(56) References Cited

U.S. PATENT DOCUMENTS

| | | | |
|---|---|---|---|
| 4,136,732 | A | 1/1979 | Demaray et al. |
| 4,341,345 | A | 7/1982 | Hammer et al. |
| 4,403,644 | A | 9/1983 | Hebert |
| 4,655,279 | A | 4/1987 | Harmon |
| 4,674,027 | A | 6/1987 | Beckey |

(Continued)

OTHER PUBLICATIONS

Arens, et al., "How Ambient Intelligence Will Improve Habitability and Energy Efficiency in Buildings", 2005, research paper, Center for the Built Environment, Controls and Information Technology.

(Continued)

*Primary Examiner* — Sujoy Kundu
(74) *Attorney, Agent, or Firm* — Knobbe, Martens, Olson & Bear, LLP

(57) ABSTRACT

The invention comprises systems and methods for estimating the rate of change in temperature inside a structure. At least one thermostat located is inside the structure and is used to control an climate control system in the structure. At least one remote processor is in communication with said thermostat and at least one database stores data reported by the thermostat. At least one processor compares the outside temperature at least one location and at least one point in time to information reported to the remote processor from the thermostat. The processor uses the relationship between the inside temperature and the outside temperature over time to derive a first estimation for the rate of change in inside temperature assuming that the operating status of the climate control system is "on". The processor also uses the relationship between the inside temperature and the outside temperature over time to derive a second estimation for the rate of change in inside temperature assuming that the operating status of the climate control system is "off". The compares at least one of the first estimation and the second estimation to the actual inside temperature recorded inside the structure to determine whether the actual rate of change in inside temperature is closer to the first estimation or the second estimation.

16 Claims, 10 Drawing Sheets

U.S. PATENT DOCUMENTS

| | | | |
|---|---|---|---|
| 5,244,146 A | 9/1993 | Jefferson et al. | |
| 5,270,952 A | 12/1993 | Adams et al. | |
| 5,314,004 A | 5/1994 | Strand et al. | |
| 5,462,225 A | 10/1995 | Massara et al. | |
| 5,544,036 A | 8/1996 | Brown et al. | |
| 5,555,927 A | 9/1996 | Shah | |
| 5,572,438 A | 11/1996 | Ehlers et al. | |
| 5,682,949 A | 11/1997 | Ratcliffe et al. | |
| 5,717,609 A | 2/1998 | Packa et al. | |
| 5,818,347 A | 10/1998 | Dolan et al. | |
| 5,977,964 A | 11/1999 | Williams et al. | |
| 6,145,751 A | 11/2000 | Ahmed | |
| 6,178,362 B1 | 1/2001 | Woolard et al. | |
| 6,260,765 B1 | 7/2001 | Natale et al. | |
| 6,351,693 B1 | 2/2002 | Monie et al. | |
| 6,400,996 B1 | 6/2002 | Hoffberg et al. | |
| 6,437,692 B1 | 8/2002 | Petite et al. | |
| 6,478,233 B1 | 11/2002 | Shah | |
| 6,480,803 B1 | 11/2002 | Pierret et al. | |
| 6,483,906 B1 | 11/2002 | Lggulden et al. | |
| 6,536,675 B1 | 3/2003 | Pesko et al. | |
| 6,542,076 B1 | 4/2003 | Joao | |
| 6,549,130 B1 | 4/2003 | Joao | |
| 6,574,537 B2 | 6/2003 | Kipersztok et al. | |
| 6,580,950 B1 | 6/2003 | Johnson et al. | |
| 6,594,825 B1 | 7/2003 | Goldschmidtlki et al. | |
| 6,595,430 B1 | 7/2003 | Shah | |
| 6,598,056 B1 | 7/2003 | Hull et al. | |
| 6,619,555 B2 | 9/2003 | Rosen | |
| 6,622,097 B2 | 9/2003 | Hunter | |
| 6,622,115 B1 | 9/2003 | Brown et al. | |
| 6,622,925 B2 | 9/2003 | Carner et al. | |
| 6,622,926 B1 | 9/2003 | Sartain et al. | |
| 6,628,997 B1 | 9/2003 | Fox et al. | |
| 6,633,823 B2 | 10/2003 | Bartone et al. | |
| 6,643,567 B2 | 11/2003 | Kolk et al. | |
| 6,671,586 B2 | 12/2003 | Davis et al. | |
| 6,695,218 B2 | 2/2004 | Fleckenstein | |
| 6,726,113 B2 | 4/2004 | Guo | |
| 6,731,992 B1 | 5/2004 | Ziegler | |
| 6,734,806 B1 | 5/2004 | Cratsley | |
| 6,772,052 B1 | 8/2004 | Amundsen | |
| 6,785,592 B1 | 8/2004 | Smith | |
| 6,785,630 B2 | 8/2004 | Kolk | |
| 6,789,739 B2 | 9/2004 | Rosen | |
| 6,853,959 B2 | 2/2005 | Ikeda et al. | |
| 6,868,293 B1 | 3/2005 | Schurr | |
| 6,868,319 B2 | 3/2005 | Kipersztok et al. | |
| 6,882,712 B1 | 4/2005 | Iggulden et al. | |
| 6,889,908 B2 | 5/2005 | Crippen et al. | |
| 6,891,838 B1 | 5/2005 | Petite et al. | |
| 6,912,429 B1 | 6/2005 | Bilger | |
| 6,991,029 B2 | 1/2006 | Orfield et al. | |
| 7,009,493 B2 | 3/2006 | Howard | |
| 7,031,880 B1 | 4/2006 | Seem et al. | |
| 7,039,532 B2 | 5/2006 | Hunter | |
| 7,061,393 B2 | 6/2006 | Buckingham et al. | |
| 7,089,088 B2 | 8/2006 | Terry et al. | |
| 7,130,719 B2 | 10/2006 | Ehlers et al. | |
| 7,130,832 B2 | 10/2006 | Bannai et al. | |
| H2176 H | 12/2006 | Meyer et al. | |
| 7,167,079 B2 | 1/2007 | Smyth et al. | |
| 7,187,986 B2 | 3/2007 | Johnson et al. | |
| 7,205,892 B2 | 4/2007 | Luebke et al. | |
| 7,215,746 B2 | 5/2007 | Iggulden et al. | |
| 7,216,015 B2 | 5/2007 | Poth | |
| 7,231,424 B2 | 6/2007 | Bodin et al. | |
| 7,232,075 B1 | 6/2007 | Rosen | |
| 7,242,988 B1 | 7/2007 | Hoffberg et al. | |
| 7,260,823 B2 | 8/2007 | Schlack et al. | |
| 7,356,384 B2 | 4/2008 | Gull et al. | |
| 7,483,964 B1 | 1/2009 | Jackson et al. | |
| 7,644,869 B2 | 1/2010 | Hoglund et al. | |
| 7,784,704 B2 | 8/2010 | Harter | |
| 7,848,900 B2 | 12/2010 | Steinberg et al. | |
| 7,894,943 B2 | 2/2011 | Sloup et al. | |
| 7,908,116 B2 * | 3/2011 | Steinberg et al. | 702/182 |
| 2003/0040934 A1 | 2/2003 | Skidmore et al. | |
| 2005/0222889 A1 | 10/2005 | Lai et al. | |
| 2005/0288822 A1* | 12/2005 | Rayburn | 700/276 |
| 2006/0045105 A1 | 3/2006 | Dobosz et al. | |
| 2007/0043477 A1 | 2/2007 | Ehlers et al. | |
| 2007/0045431 A1 | 3/2007 | Chapman et al. | |
| 2007/0146126 A1 | 6/2007 | Wang | |
| 2008/0083234 A1 | 4/2008 | Krebs et al. | |
| 2008/0281472 A1 | 11/2008 | Podgorny et al. | |
| 2009/0052859 A1 | 2/2009 | Greenberger et al. | |
| 2009/0099699 A1 | 4/2009 | Steinberg et al. | |
| 2009/0125151 A1 | 5/2009 | Steinberg et al. | |
| 2009/0240381 A1 | 9/2009 | Lane | |
| 2009/0281667 A1 | 11/2009 | Masui et al. | |
| 2010/0019052 A1 | 1/2010 | Yip | |
| 2010/0070086 A1 | 3/2010 | Harrod et al. | |
| 2010/0070089 A1 | 3/2010 | Harrod et al. | |
| 2010/0070093 A1 | 3/2010 | Harrod et al. | |
| 2010/0156608 A1 | 6/2010 | Bae et al. | |
| 2010/0162285 A1 | 6/2010 | Cohen et al. | |
| 2010/0211224 A1 | 8/2010 | Keeling et al. | |
| 2010/0235004 A1 | 9/2010 | Thind | |
| 2010/0289643 A1 | 11/2010 | Trundle et al. | |
| 2011/0031323 A1 | 2/2011 | Nold et al. | |

OTHER PUBLICATIONS

Comverge SuperStat Flyer.
Control4 Wireless Thermostat Brochure.
Cooper Power Systems Web Page.
Enernoc Web Page.
Enerwise Website.
Honeywell Programmable Thermostat Owner's Guide, www.honeywell.com/yourhome.
Honeywell, W7600/W7620 Controller Reference Manual, HW0021207, Oct. 1992.
Johnson Controls, Touch4 building automation system brochure, 2007.
Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.
Lin, et al., "Multi-Sensor Single-Actuator Control of HVAC Systems", 2002.
Pier, Southern California Edison, Demand Responsive Control of Air Conditioning via Programmable Communicating Thermostats Draft Report.
Proliphix Thermostat Brochure.
Wang, et al., "Opportunities to Save Energy and Improve Comfort by Using Wireless Sensor Networks in Buildings," (2003), Center for Environmental Design Research.
Wetter, et al., A comparison of deterministic and probabilistic optimization algorithms for nonsmooth simulation-based optimization., Building and Environment 39, 2004, pp. 989-999.
Emerson Climate Technologies, "Network Thermostat for E2 Building Controller Installation and Operation Manual", 2007.
Johnson Controls, "T600HCx-3 Single-Stage Thermostats", 2006.

* cited by examiner

SYSTEM AND METHOD FOR USING A NETWORK OF THERMOSTATS AS TOOL TO VERIFY PEAK DEMAND REDUCTION

CROSS-REFERENCE TO RELATED APPLICATIONS

This application is a continuation of U.S. patent application Ser. No. 12/183,949, filed Jul. 31, 2008, which claims the benefit of priority under 35 U.S.C. §119(e) to both U.S. Provisional Application 60/963,183, filed Aug. 3, 2007; and U.S. Provisional Application No. 60/994,011, filed Sep. 17, 2007, the entireties of which are incorporated herein by reference and are to be considered part of this specification.

BACKGROUND OF THE INVENTION

1. Field of the Invention

This invention relates to the use of thermostatic HVAC controls that are connected to a computer network as a part of a system for offering peak demand reduction to electric utilities. More specifically, the present invention pertains to use of communicating thermostat combined with a computer network to verify that demand reduction has occurred.

2. Background

Climate control systems such as heating and cooling systems for buildings (heating, ventilation and cooling, or HVAC systems) have been controlled for decades by thermostats. At the most basic level, a thermostat includes a means to allow a user to set a desired temperature, a means to sense actual temperature, and a means to signal the heating and/or cooling devices to turn on or off in order to try to change the actual temperature to equal the desired temperature. The most basic versions of thermostats use components such as a coiled bi-metallic spring to measure actual temperature and a mercury switch that opens or completes a circuit when the spring coils or uncoils with temperature changes. More recently, electronic digital thermostats have become prevalent. These thermostats use solid-state devices such as thermistors or thermal diodes to measure temperature, and microprocessor-based circuitry to control the switch and to store and operate based upon user-determined protocols for temperature vs. time.

These programmable thermostats generally offer a very restrictive user interface, limited by the cost of the devices, the limited real estate of the small wall-mounted boxes, and the inability to take into account more than two variables: the desired temperature set by the user, and the ambient temperature sensed by the thermostat. Users can generally only set one series of commands per day, and to change one parameter (e.g., to change the late-night temperature) the user often has to cycle through several other parameters by repeatedly pressing one or two buttons.

As both the cost of energy and the demand for electricity have increased, utilities supplying electricity increasingly face unpleasant choices. The demand for electricity is not smooth over time. In so-called "summer peaking" locations, on the hottest days of the year, peak loads may be twice as high as average loads. During such peak load periods (generally in the late afternoon), air conditioning can be the largest single element of demand.

Utilities and their customers generally see reductions of supply (brownouts and blackouts) as an unacceptable outcome. But their other options can be almost as distasteful. In the long term, they can build additional generating capacity, but that approach is very expensive given the fact that such capacity may be needed for only a few hours a year. And this option is of course unavailable in the short term. When confronted with an immediate potential shortfall, a utility may have reserve capacity it can choose to bring online. But because utilities are assumed to try to operate as efficiently as possible, the reserve capacity is likely to be the least efficient and most expensive and/or more polluting plants to operate. Alternatively, the utility may seek to purchase additional power on the open market. But the spot market for electricity, which cannot efficiently be stored, is extremely volatile, which means that spot prices during peak events may be as much as 10× the average price.

More recently, many utilities have begun to enter into agreements with certain customers to reduce demand, as opposed to increasing supply. In essence, these customers agree to reduce usage during a few critical periods in exchange for incentives from the utility. Those incentives may take the form of a fixed contract payment in exchange for the right to cut the amount of power supplied at specified times, or a reduced overall price per kilowatt-hour, or a rebate each time power is reduced, or some other method.

The bulk of these peak demand reduction (PDR) contracts have been entered into with large commercial and industrial customers. This bias is in large part due to the fact that transaction costs are much lower today for a single contract with a factory that can offer demand reduction of 50 megawatts than they would be for the equivalent from residential customers—it could take 25,000 or more homes to equal that reduction if these homes went without air conditioning.

But residential air conditioning is the largest single component of peak demand in California, and is a large percentage in many other places. There are numerous reasons why it would be economically advantageous to deploy PDR in the residential market. Whereas cutting energy consumption at a large factory could require shutting down or curtailing production, which has direct economic costs, cutting consumption for a couple of hours in residences is likely to have no economic cost, and may only result in minor discomfort—or none at all if no one is at home at the time.

Residential PDR has been attempted. But there have been numerous command and control issues with these implementations. The standard approach to residential PDR has been to attach a radio-controlled switch to the control circuitry located outside the dwelling. These switches are designed to receive a signal from a transmitter that signals the compressor to shut off during a PDR call.

There are a number of technical complications with this approach. There is some evidence that "hard cycling" the compressor in this manner can damage the air conditioning system. There are also serious issues resulting from the fact that the communication system is unidirectional. When utilities contract for PDR, they expect verification of compliance. One-way pagers allow the utility to send a signal that will shut of the A/C, but the pager cannot confirm to the utility that the A/C unit has in fact been shut off. If a consumer tampers with the system so that the A/C can be used anyway, the utility will not be able to detect it, absent additional verification systems.

One way in which some utilities are seeking to address this issue is to combine the pager-controlled thermostat with so-called advanced metering infrastructure (AMI). This approach relies on the deployment of "smart meters"—electric meters that are more sophisticated than the traditional meter with its mechanical odometer mechanism for logging only cumulative energy use. Smart meters generally include a means for communicating instantaneous readings. That communication may in the form of a signal sent over the power lines themselves, or a wireless communication over a data network arranged by the utility. These meters allow utilities to accomplish a number of goals, including offering pricing that varies by time of day in order to encourage customers to move consumption away from peak demand hours. These smart meters can cost hundreds of dollars, however, and require both a "truck roll"—a visit from a trained service person— and most likely the scheduling of an appointment with the occupants, because swapping the meter will require turning off power to the house.

If the utility installs a smart meter at each house that contracts to participate in a PDR program, it may be possible to verify that the A/C is in fact switched off. But this approach requires two separate pieces of hardware, two separate communications systems, and the ability to match them for verification purposes.

It would be desirable to have a system that could both implement and verify residential peak demand reduction with reduced expenses.

SUMMARY OF THE INVENTION

At least one embodiment of the invention that includes system for predicting the rate of change in temperature inside a structure comprising at least one thermostat located inside the structure and controlling an HVAC system in said structure; at least one remote processor that is in communication with said thermostat; at least one database for storing data reported by said thermostat; at least one processor that compares outside temperature at least location and at least one point in time to information reported to said remote processor from said thermostat, and wherein said processor uses the relationship between the inside temperature and the outside temperature over time to derive a first prediction for the rate of change in inside temperature assuming that the operating status of the HVAC system is "on"; and said processor uses the relationship between the inside temperature and the outside temperature over time to derive a second prediction for the rate of change in inside temperature assuming that the operating status of the HVAC system is "off"; and said processor compares at least one of the first prediction and the second prediction to the actual inside temperature recorded inside the structure to determine whether the actual inside temperature is closer to the first prediction or the second prediction.

In one embodiment, the invention comprises a thermostat attached to an HVAC system, a local network connecting the thermostat to a larger network such as the Internet, one or more additional thermostats attached to the network and to other HVAC systems, and a server in bi-directional communication with the thermostats. The server logs the ambient temperature sensed by each thermostat vs. time and the signals sent by the thermostats to the HVAC systems to which they are attached. The server preferably also logs outside temperature and humidity data for the geographic locations for the buildings served by the connected HVAC systems. Such information is widely available from various sources that publish detailed weather information based on geographic areas such as by ZIP code. The server also stores other data affecting the load upon the system, such as specific model of HVAC system, occupancy, building characteristics, etc. Some of this data may be supplied by the individual users of the system, while other data may come from commercial sources such as the electric and other utilities who supply energy to those users.

By using these multiple data streams to compare the performance of one system versus another, and one system versus the same system at other times, the server is able to estimate the effective thermal mass of the structure, and thereby predict the expected thermal performance of a given structure in response to changes in outside temperature. Thus, for example, if the air conditioning is shut off on a hot afternoon, given a known outside temperature, it will be possible to predict how quickly the temperature in the house should rise. If the actual temperature change is significantly different from the predicted rate of change, or does not change at all, it is possible to infer that the air conditioning has not, in fact been shut off.

This and other advantages of the present invention are explained in the detailed description and claims that make reference to the accompanying diagrams and flowcharts.

DETAILED DESCRIPTION OF THE PREFERRED EMBODIMENTS

Figure 1:
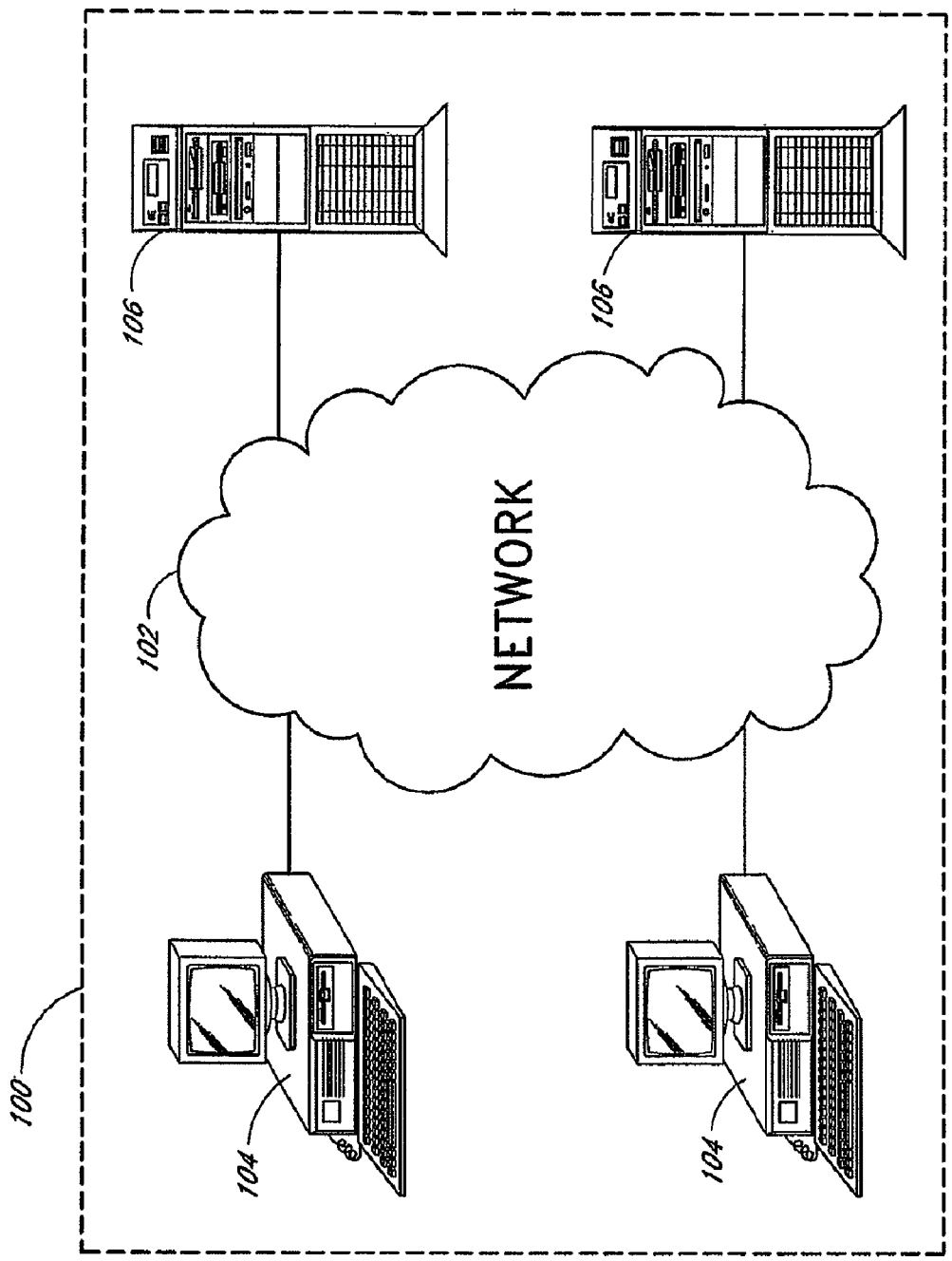
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

When a user of the subject invention wishes to access information on network 102, the buyer initiates connection from his computer 104. For example, the user invokes a browser, which executes on computer 104. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network.

Computers 104 utilize a browser configured to interact with the World Wide Web. Such browsers may include Microsoft Explorer, Mozilla, Firefox, Opera or Safari. They may also include browsers used on handheld and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
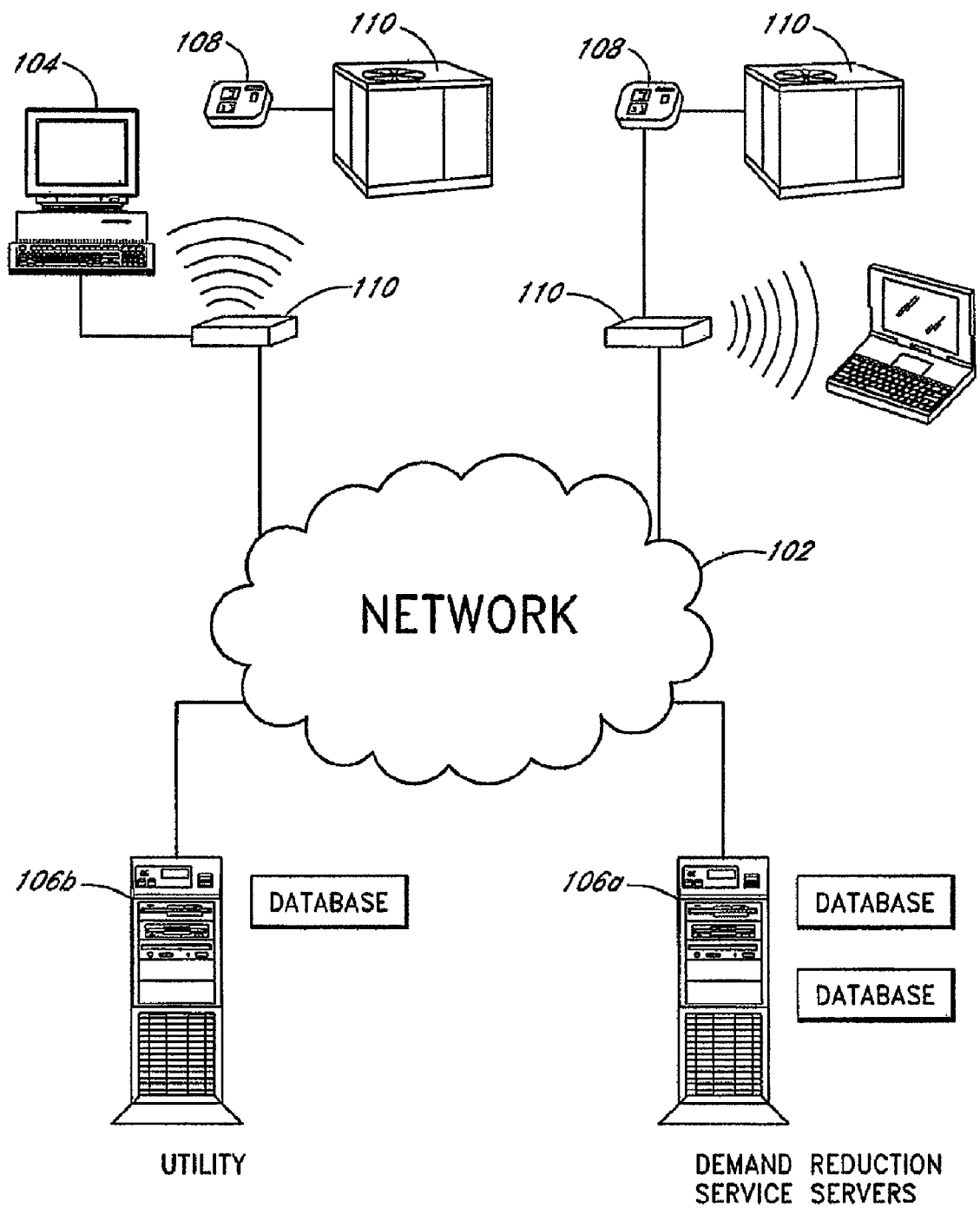
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user is connected to the servers 106a via wired or wireless connection such as Ethernet or a wireless protocol such as IEEE 802.11, a gateway 110 that connects the computer and thermostat to the Internet via a broadband connection such as a digital subscriber line (DSL) or other form of broadband connection to the World Wide Web. In one embodiment, electric utility server 106a and demand reduction service server 106b are in communication with the network 102. Servers 106a and 106b contain the content to be served as web pages and viewed by computers 104, as well as databases containing information used by the servers. Also connected to the servers 106a via the Internet are computers located at one or more electrical utilities 106b.

Figure 3:
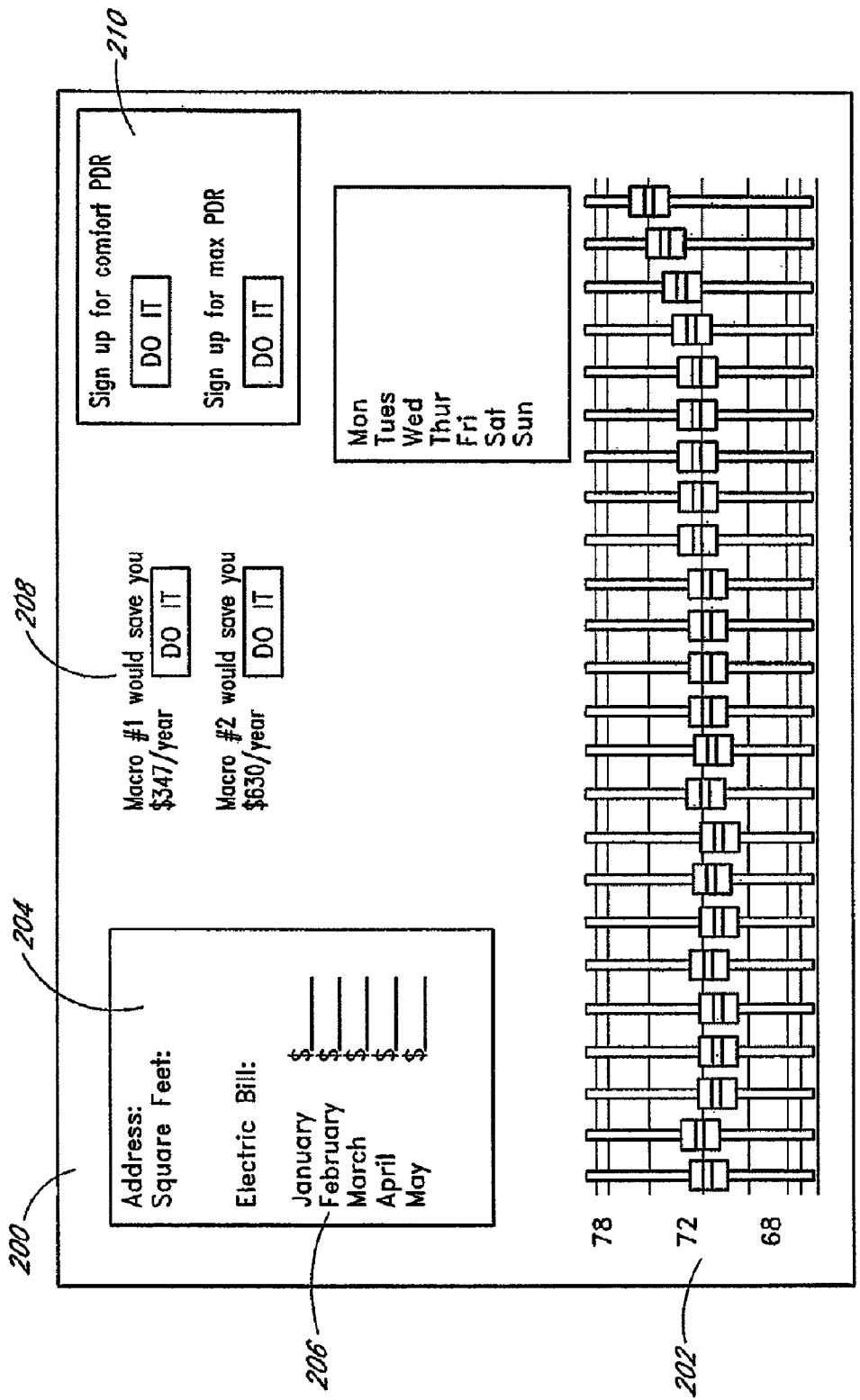
FIG. 3 shows an embodiment of the website to be used as part of the subject invention.

In the currently preferred embodiment, the website 200 includes a number of components accessible to the user, as shown in FIG. 3. Those components may include a means to store temperature settings 202, a means to enter information about the user's home 204, a means to enter the user's electricity bills 206, means to calculate energy savings that could result from various thermostat-setting strategies 208, and means to enable and choose between various arrangements 210 for demand reduction with their electric utility provider as intermediated by the demand reduction service provider.

Figure 4:
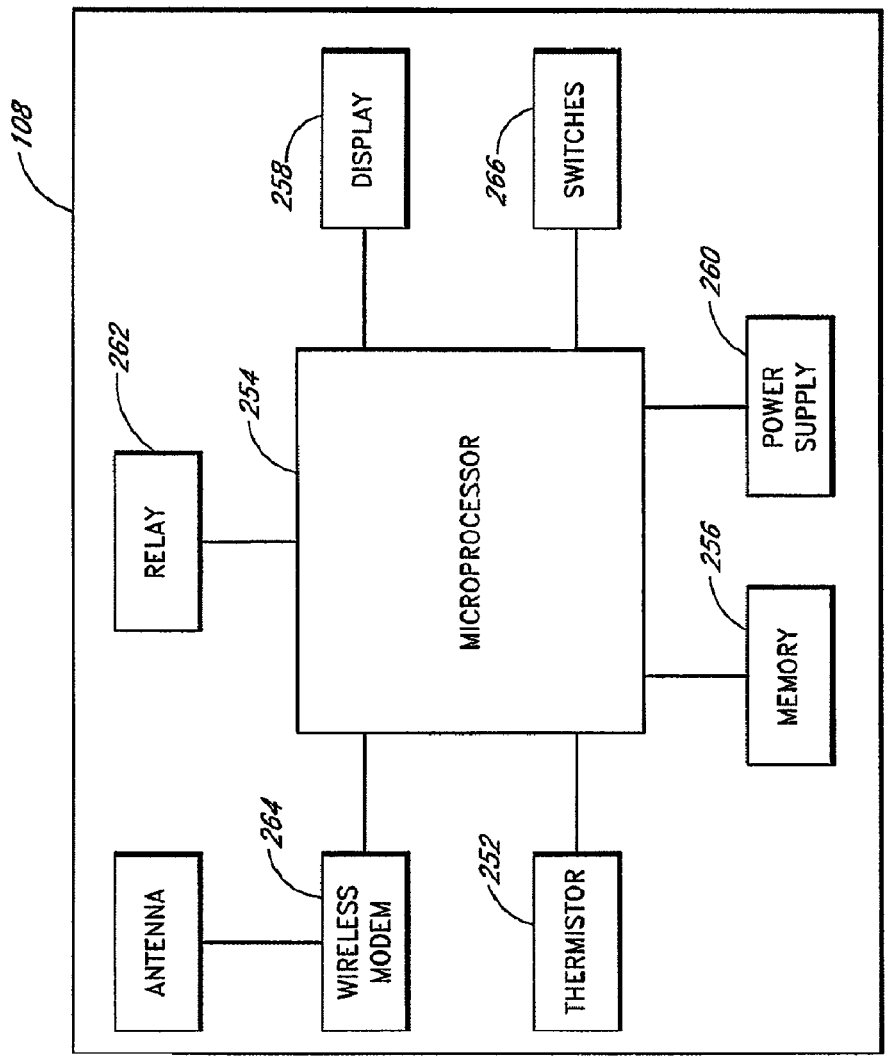
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, a relay 262, which turns the HVAC system on and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or to a wireless network. Such means could be in the form of Ethernet, wireless protocols such as IEEE 802.11, IEEE 802.15.4, Bluetooth, or other wireless protocols. (Other components as needed) The thermostat 250 may also include controls 266 allowing users to change settings directly at the thermostat, but such controls are not necessary to allow the thermostat to function.

Figure 5:
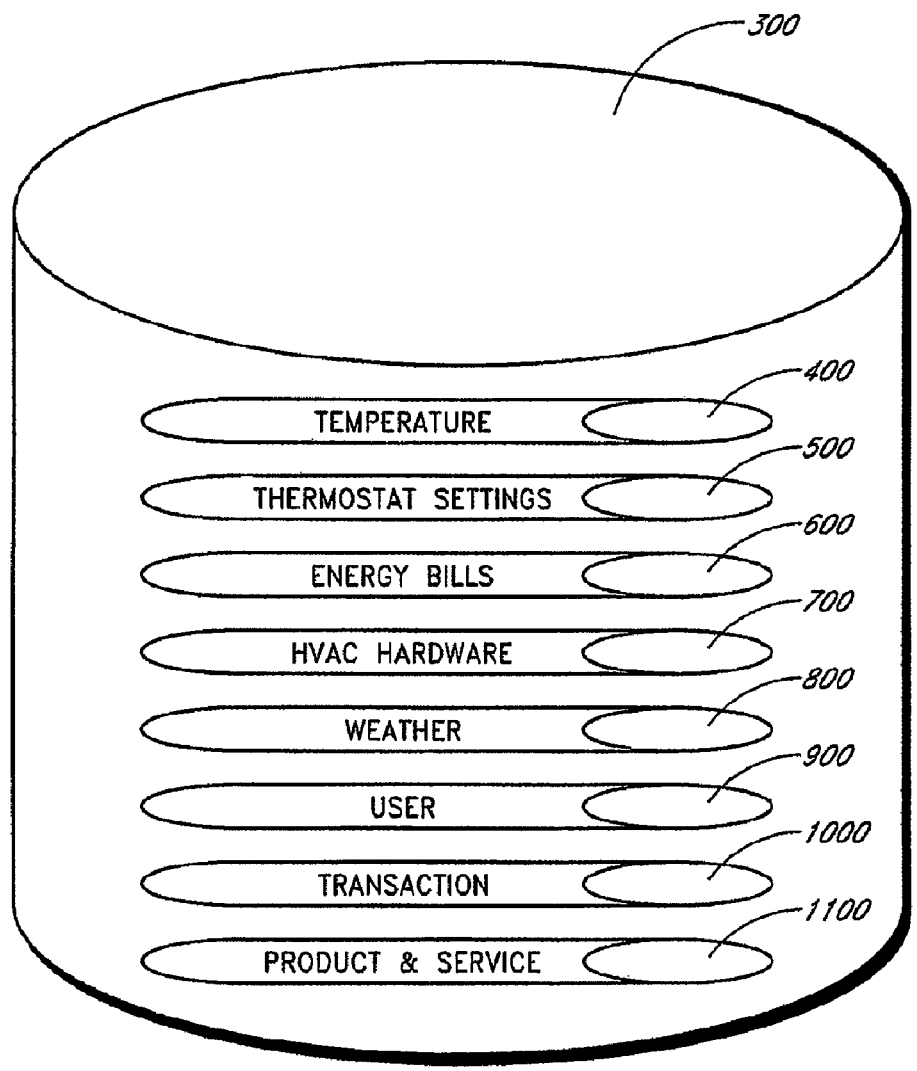
FIG. 5 shows one embodiment of the database structure used as part of the subject invention

The data used to generate the content delivered in the form of the website is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website will allow users of connected thermostats 250 to create personal accounts. Each user's account will store information in database 900, which tracks various attributes relative to users of the site. Such attributes may include the make and model of the specific HVAC equipment in the user's home; the age and square footage of the home, the solar orientation of the home, the location of the thermostat in the home, the user's preferred temperature settings, whether the user is a participant in a demand reduction program, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and set macros that will allow changing the settings of the temperature for all periods with a single gesture such as a mouse click.

In addition to using the system to allow better signaling and control of the HVAC system, which relies primarily on communication running from the server to the thermostat, the bi-directional communication will also allow the thermostat 108 to regularly measure and send to the server information about the temperature in the building. By comparing outside temperature, inside temperature, thermostat settings, cycling behavior of the HVAC system, and other variables, the system will be capable of numerous diagnostic and controlling functions beyond those of a standard thermostat.

Figure 6A:
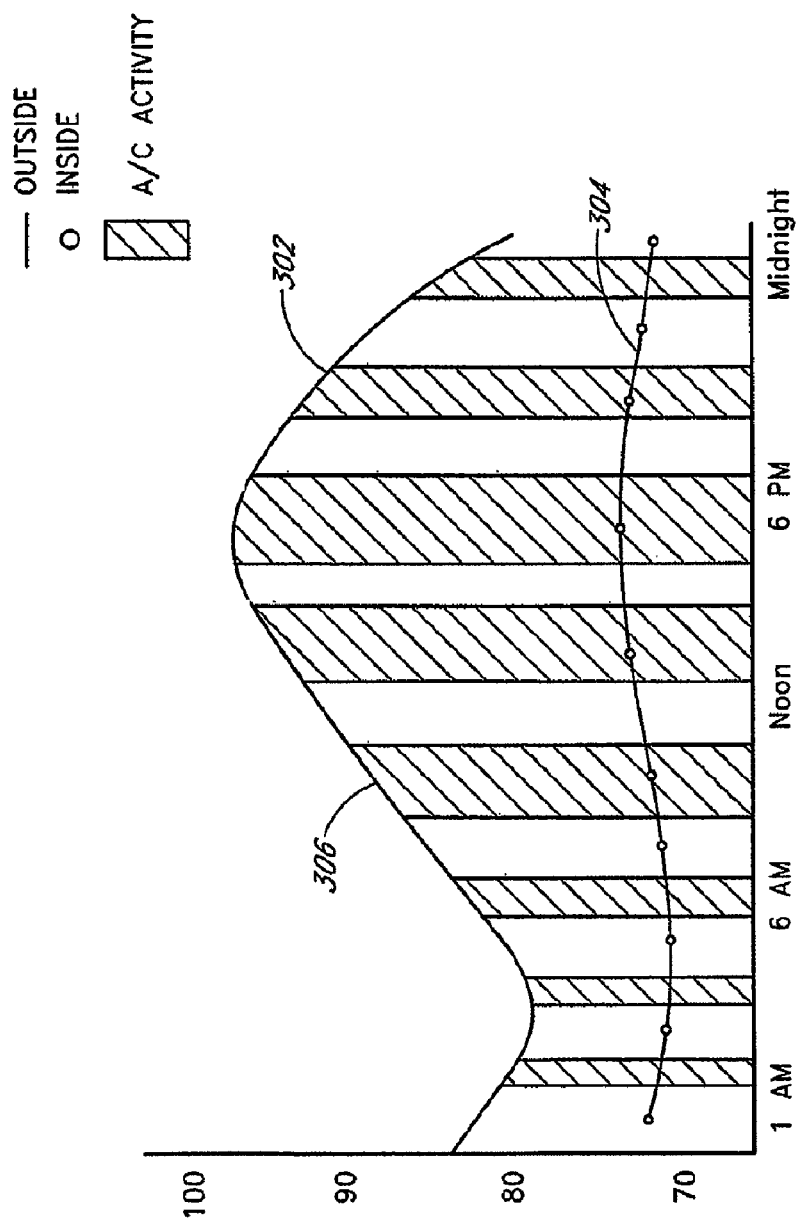
FIGS. 6A and 6B show a graphical representation of the manner in which the subject invention may be used to verify that a demand reduction event has occurred.

For example, FIG. 6a shows a graph of inside temperature, outside temperature and HVAC activity for a 24 hour period. When outside temperature 302 increases, inside temperature 304 follows, but with some delay because of the thermal mass of the building, unless the air conditioning 306 operates to counteract this effect. When the air conditioning turns on, the inside temperature stays constant (or rises at a much lower rate) despite the rising outside temperature. In this example, frequent and heavy use of the air conditioning results in only a very slight temperature increase inside o the house of 4 degrees, from 72 to 76 degrees, despite the increase in outside temperature from 80 to 100 degrees.

Figure 6B:
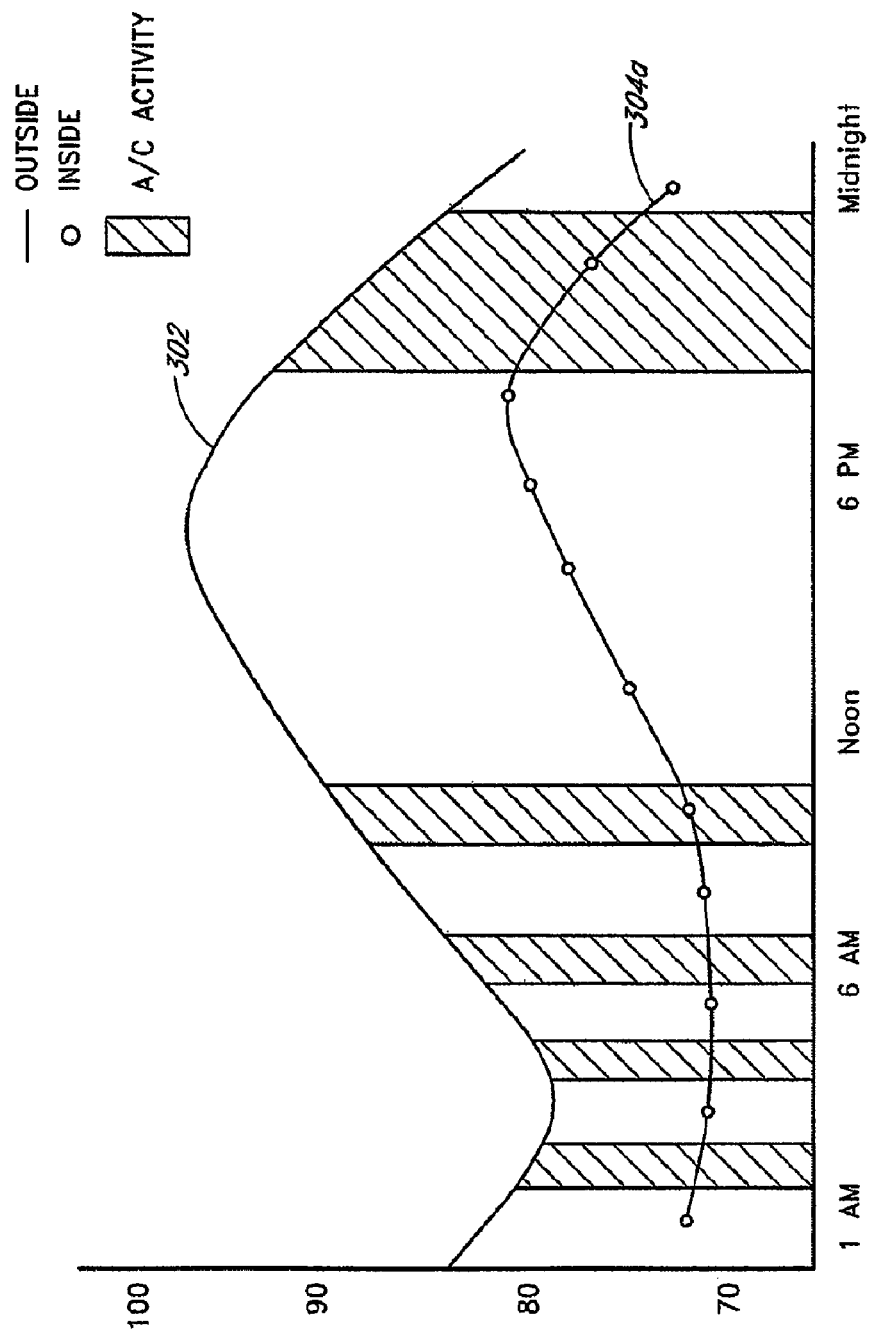

FIG. 6b shows a graph of the same house on the same day, but assumes that the air conditioning is turned off from noon to 7 PM. As expected, the inside temperature 304a rises with increasing outside temperatures 302 for most of that period, reaching 88 degrees at 7 PM.

Because server 106a logs the temperature readings from inside each house (whether once per minute or over some other interval), as well as the timing and duration of air conditioning cycles, database 300 will contain a history of the thermal performance of each house. That performance data will allow the server 106a to calculate an effective thermal mass for each such structure—that is, the speed with the temperature inside a given building will change in response to changes in outside temperature. Because the server will also log these inputs against other inputs including time of day, humidity, etc. the server will be able to predict, at any given time on any given day, the rate at which inside temperature should change for given inside and outside temperatures.

As shown in FIG. 3, website 200 will allow the users to opt 210 into a plan that offers incentives such as cash or rebates in exchange for reduced air conditioning use during peak load periods.

Figure 7:
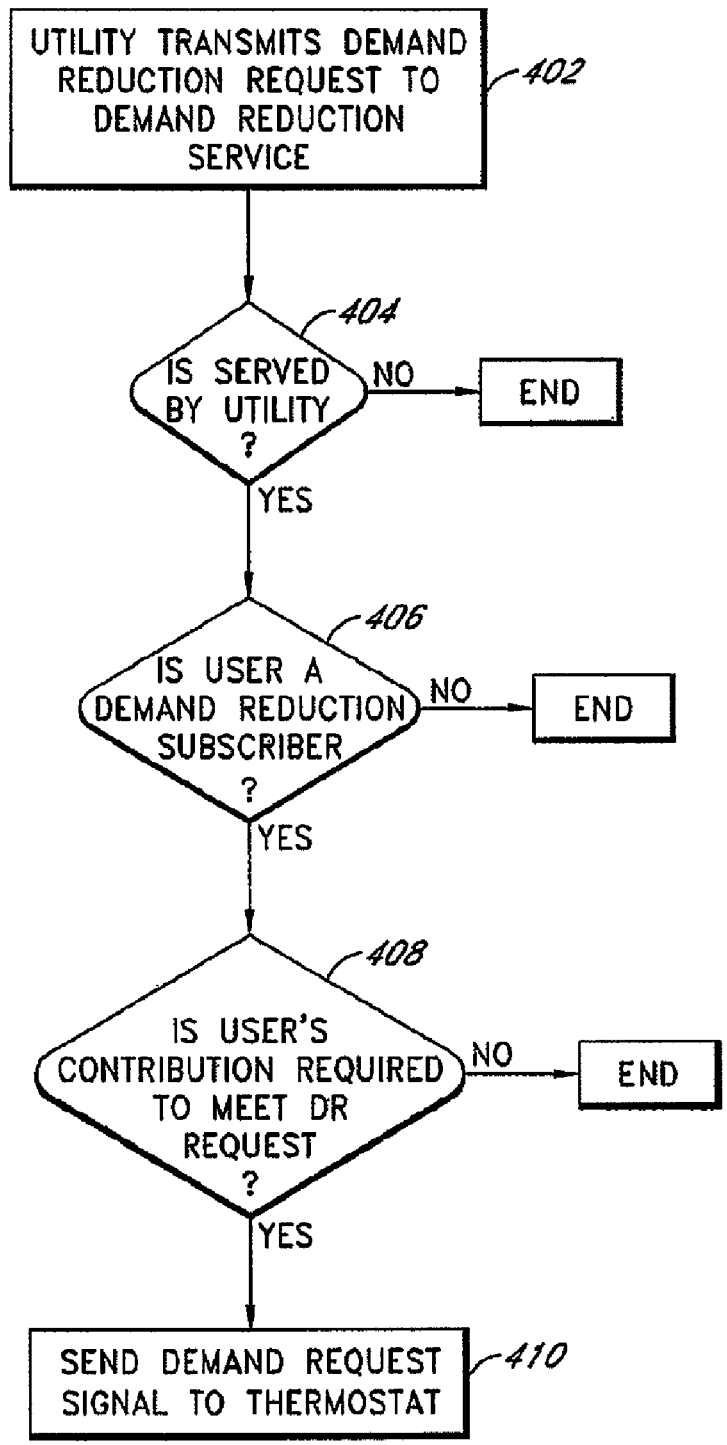
FIG. 7 is a flow chart illustrating the steps involved in generating a demand reduction event for a given subscriber.

FIG. 7 shows the steps followed in order to initiate air conditioner shutoff. When a summer peak demand situation occurs, the utility will transmit an email 402 or other signal to server 106a requesting a reduction in load. Server 106a will determine 404 if the user's house is served by the utility seeking reduction; determine 406 if a given user has agreed to reduce peak demand; and determine 408 if a reduction of consumption by the user is required or desirable in order to achieve the reduction in demand requested by the utility. The server will transmit 410 a signal to the user's thermostat 108 signaling the thermostat to shut off the air conditioner 110.

Figure 8:
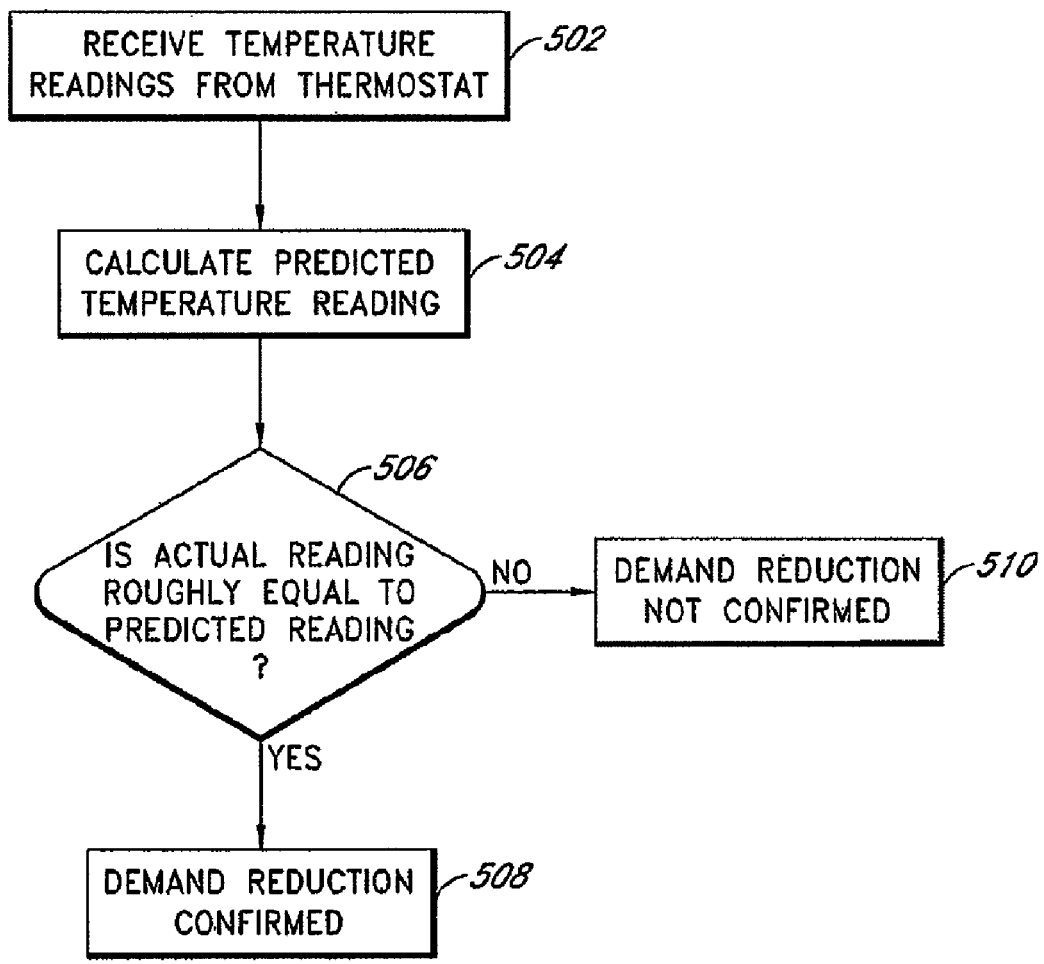
FIG. 8 is a flow chart illustrating the steps involved in confirming that a demand reduction event has taken place.

FIG. 8 shows the steps followed in order to verify that the air conditioner has in fact been shut off. Server 106a will receive and monitor 502 the temperature readings sent by the user's thermostat 108. The server then calculates 504 the temperature reading to be expected for that thermostat given inputs such as current and recent outside temperature, recent inside temperature readings, the calculated thermal mass of the structure, temperature readings in other houses, etc. The server will compare 506 the predicted reading with the actual reading. If the server determines that the temperature inside the house is rising at the rate predicted if the air conditioning is shut off, then the server confirms 508 that the air conditioning has been shut off. If the temperature reading from the thermostat shows no increase, or significantly less increase than predicted by the model, then the server concludes 510 that the air conditioning was not switched off, and that no contribution to the demand response request was made.

For example, assume that on at 3 PM on date Y utility X wishes to trigger a demand reduction event. A server at utility X transmits a message to the server at demand reduction service provider Z requesting W megawatts of demand reduction. Demand reduction service provider server determines that it will turn off the air conditioner at house A in order to achieve the required demand reduction. At the time the event is triggered, the inside temperature as reported by the thermostat in house A is 72 degrees F. The outside temperature near house A is 96 degrees Fahrenheit. The inside temperature at House B, which is not part of the demand reduction program, but is both connected to the demand reduction service server and located geographically proximate to House A, is 74 F. Because the A/C in house A has been turned off, the temperature inside House A begins to rise, so that at 4 PM it has increased to 79 F. Because the server is aware of the outside temperature, which remains at 96 F, and of the rate of temperature rise inside house A on previous days on which temperatures have been at or near 96 F, and the temperature in house B, which has risen only to 75 F because the air conditioning in house B continues to operate normally, the server is able to confirm with a high degree of certainty that the A/C in house A has indeed been shut off.

In contrast, if the HVAC system at house A has been tampered with, so that a demand reduction signal from the server does not actually result in shutting off the A/C in house A, when the server compares the rate of temperature change at house A against the other data points, the server will receive data inconsistent with the rate of increase predicted. As a result, it will conclude that the A/C has not been shut off in house A as expected, and will not credit house A with the financial credit that would be associated with demand reduction compliance, or may trigger a business process that could result in termination of house A's participation in the demand reduction program.

Figure 9:
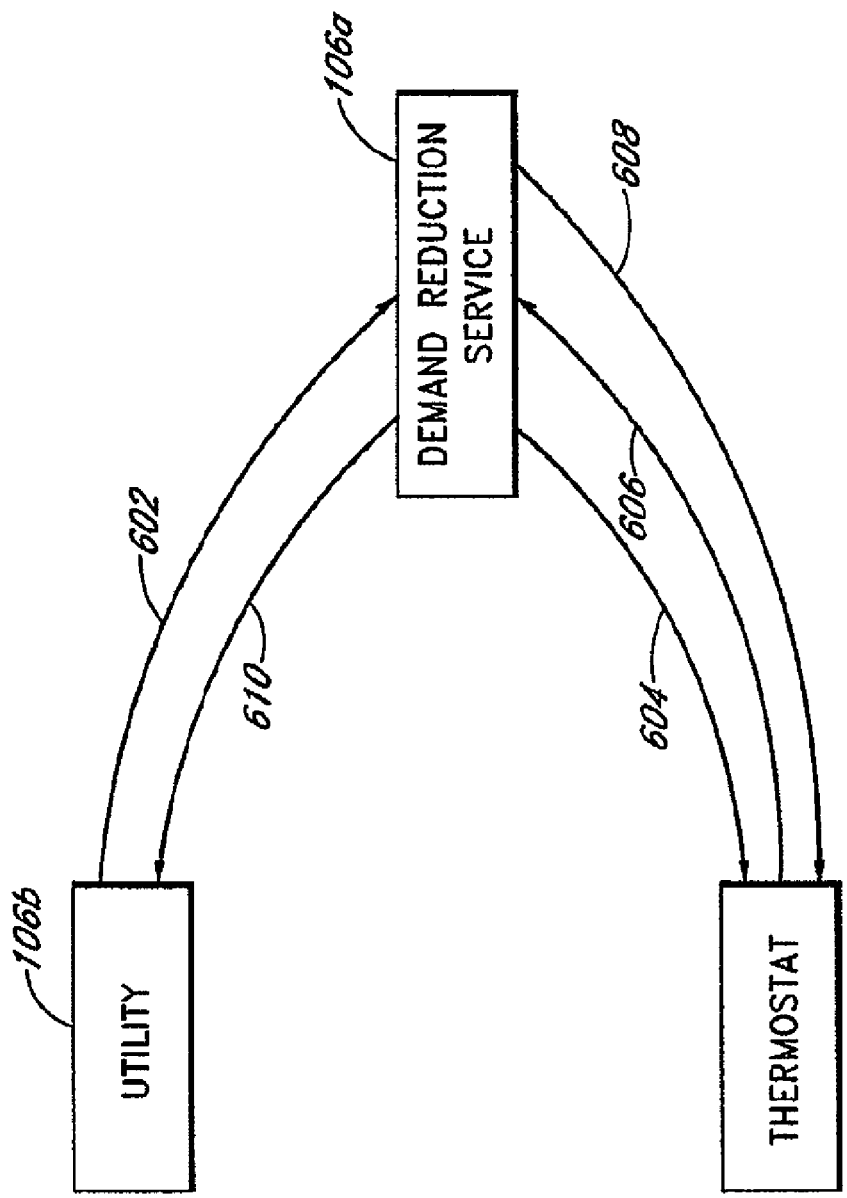
FIG. 9 is a representation of the movement of messages and information between the components of the subject invention.

FIG. 9 illustrates the movement of signals and information between the components of the subject invention to trigger and verify a demand reduction response. In step 602 the electric utility server 106b transmits a message to demand reduction service server 106a requesting a demand reduction of a specified duration and size. Demand reduction service server 106a uses database 300 to determine which subscribers should be included in the demand reduction event. For each included subscriber, the server then sends a signal 604 to the subscriber's thermostat instructing it (a) to shut down at the appropriate time or (b) to allow the temperature as measured by the thermostat to increase to a certain temperature at the specified time, depending upon the agreement between the homeowner and the demand reduction aggregator. The server then receives 606 temperature signals from the subscriber's thermostat. At the conclusion of the demand reduction event, the server transmits a signal 608 to the thermostat permitting the thermostat to signal its attached HVAC system to resume cooling, if the system has been shut off, or to reduce the target temperature to its pre-demand reduction setting, if the target temperature was merely increased. After determining the total number of subscribers actually participating in the DR event, the server then calculates the total demand reduction achieved and sends a message 610 to the electric utility confirming such reduction.

Additional steps may be included in the process. For example, if the subscriber has previously requested that notice be provided when a peak demand reduction event occurs, the server will also send an alert, which may be in the form of an email message or an update to the personalized web page for that user, or both. If the server determines that a given home has (or has not) complied with the terms of its demand reduction agreement, the server will send a message to the subscriber confirming that fact.

It should also be noted that in some climate zones, peak demand events occur during extreme cold weather rather than (or in addition to) during hot weather. The same process as discussed above could be employed to reduce demand by shutting off electric heaters and monitoring the rate at which temperatures fall.

It should also be noted that the peak demand reduction service can be performed directly by a power utility, so that the functions of server 106a can be combined with the functions of server 106b.

The system installed in a subscriber's home may optionally include additional temperature sensors at different locations within the building. These additional sensors may we connected to the rest of the system via a wireless system such as 802.11 or 802.15.4, or may be connected via wires. Additional temperature and/or humidity sensors may allow increased accuracy of the system, which can in turn increase user comfort, energy savings or both.

While particular embodiments of the present invention have been shown and described, it is apparent that changes and modifications may be made without departing from the invention in its broader aspects and, therefore, the invention may carried out in other ways without departing from the true spirit and scope. These and other equivalents are intended to be covered by the following claims:

What is claimed is:

1. A system for monitoring the operational status of an HVAC system comprising:
    at least one HVAC control system associated with a first structure that receives temperature measurements from at least a first structure conditioned by at least one HVAC system;
    one or more processors that receive measurements of outside temperatures from at least one source other than said HVAC system,
    wherein said one or more processors compares the inside temperature of said first structure and the outside temperature over time to derive an estimation for the rate of change in inside temperature of said first structure assuming that the operating status of the first HVAC system is "off", and
    wherein said one or more processors compare an inside temperature recorded inside the first structure with said estimation for the rate of change in inside temperature of said first structure assuming that the operating status of the first HVAC system is "off" to determine whether the first HVAC system is on or off.

2. A system as in claim 1 in which said one or more processors receive measurements of outside temperatures for geographic regions such as ZIP codes from sources other than said HVAC system.

3. A system as in claim 1 in which said HVAC system is located within a single family dwelling.

4. A system as in claim 1 in which said HVAC system comprises a programmable thermostat.

5. A system as in claim 1 in which said HVAC system comprises a programmable thermostat that communicates with said system using a mesh networking protocol.

6. A system as in claim 1 in which said HVAC system comprises a programmable thermostat that communicates with said system using the Internet.

7. A system as in claim 1 in which said one or more processors communicate with said HVAC system using a network that includes an electricity meter.

8. A system as in claim 1 in which said estimation is a prediction about the future rate of change in temperature inside said structure.

9. A method for monitoring the operation of an HVAC system comprising:
    receiving temperature measurements from at least one HVAC control system associated with a first structure conditioned by at least one HVAC system;
    receiving at one or more processors, measurements of outside temperatures from at least one source other than said HVAC system;
    comparing with said one or more processors the inside temperature of said first structure and the outside temperature over time to derive an estimation for the rate of change in inside temperature of said first structure assuming that the operating status of the first HVAC system is "off", and
    comparing with said one or more processors, an inside temperature recorded inside the first structure with said estimation for the rate of change in inside temperature of said first structure assuming that the operating status of the first HVAC system is "off" to determine whether the first HVAC system is on or off.

10. A method as in claim 9 in which said one or more processors receive measurements of outside temperatures for geographic regions such as ZIP codes from sources other than said HVAC system.

11. A method as in claim 9 in which said HVAC system is located within a single family dwelling.

12. A method as in claim 9 in which said HVAC system comprises a programmable thermostat.

13. A method as in claim 9 in which said HVAC system comprises a programmable thermostat that communicates with said system using a mesh networking protocol.

14. A method as in claim 9 in which said HVAC system comprises a programmable thermostat that communicates with said system using the Internet.

15. A method as in claim 9 in which said one or more processors communicate with said HVAC system using a network that includes an electricity meter.

16. A method as in claim 9 in which said estimation is a prediction about the future rate of change in temperature inside said structure.

* * * * *